United States Patent
Chan

(10) Patent No.: US 10,356,689 B2
(45) Date of Patent: Jul. 16, 2019

(54) METHOD AND SYSTEM WITH SEPARATION OF SESSION ANCHOR AND FORWARDING ANCHOR

(71) Applicant: Futurewei Technologies, Inc., Plano, TX (US)

(72) Inventor: Hinghung Anthony Chan, Plano, TX (US)

(73) Assignee: FUTUREWEI TECHNOLOGIES, INC., Plano, TX (US)

(*) Notice: Subject to any disclaimer, the term of this patent is extended or adjusted under 35 U.S.C. 154(b) by 178 days.

(21) Appl. No.: 15/060,476

(22) Filed: Mar. 3, 2016

(65) Prior Publication Data

US 2016/0262083 A1    Sep. 8, 2016

Related U.S. Application Data

(60) Provisional application No. 62/129,648, filed on Mar. 6, 2015.

(51) Int. Cl.
*H04W 40/22* (2009.01)
*H04W 76/10* (2018.01)
(Continued)

(52) U.S. Cl.
CPC ........... *H04W 40/22* (2013.01); *H04L 67/146* (2013.01); *H04L 67/289* (2013.01); *H04W 8/087* (2013.01);
(Continued)

(58) Field of Classification Search
CPC ..... H04L 41/048; H04L 63/304; H04W 8/082
See application file for complete search history.

(56) References Cited

U.S. PATENT DOCUMENTS

2006/0018296 A1    1/2006  Muraoka et al.
2008/0002662 A1*   1/2008  Grayson ................. H04L 45/00
                                                                370/351
(Continued)

FOREIGN PATENT DOCUMENTS

CN    101621785 A    1/2010
CN    101635663 A    1/2010
(Continued)

OTHER PUBLICATIONS

Chan, et al., "Enhanced mobility anchoring draft-chan-dmm-enchanced-mobility-anchoring-00," Internet Engineering Task Force, IETF, DMM Internet-Draft, Jul. 3, 2014, 10 pages.

*Primary Examiner* — Mansour Oveissi
(74) *Attorney, Agent, or Firm* — Slater Matsil, LLP

(57) ABSTRACT

A method for mobility management for a mobile node that establishes a connection with a first network while in a second network and traverses to a third network includes transferring location management information from the second network to the first network. An indirection path from the first network to the third network is established for data packets directed to the mobile node. The data packets directed to the mobile node are transferred using the indirection path without traversing the second network. This allows for the address anchor of the connection to remain at the second network while providing a flow anchor at the first network, which allows a direct flow to the third network.

20 Claims, 13 Drawing Sheets

(51) Int. Cl.
*H04W 8/08* (2009.01)
*H04L 29/08* (2006.01)
*H04W 88/16* (2009.01)
*H04W 80/04* (2009.01)

(52) U.S. Cl.
CPC ............ *H04W 76/10* (2018.02); *H04W 80/04* (2013.01); *H04W 88/16* (2013.01)

(56) References Cited

U.S. PATENT DOCUMENTS

| | | |
|---|---|---|
| 2011/0090868 A1 | 4/2011 | Zhang et al. |
| 2012/0044949 A1* | 2/2012 | Velev .................... H04W 8/082 370/401 |
| 2013/0176943 A1 | 7/2013 | Chan |
| 2014/0307629 A1 | 10/2014 | Liebsch |
| 2015/0201365 A1 | 7/2015 | Chan |
| 2015/0312806 A1 | 10/2015 | Perras et al. |

FOREIGN PATENT DOCUMENTS

| | | |
|---|---|---|
| CN | 104041093 A | 9/2014 |
| JP | 2012524437 A | 10/2012 |
| WO | 2004109993 A1 | 12/2004 |
| WO | 2014085761 A3 | 9/2014 |

* cited by examiner

METHOD AND SYSTEM WITH SEPARATION OF SESSION ANCHOR AND FORWARDING ANCHOR

This application claims the benefit of U.S. Provisional Application No. 62/129,648, filed on Mar. 6, 2015, which application is hereby incorporated herein by reference.

TECHNICAL FIELD

The present disclosure relates to wireless communications, and, in particular embodiments, to a method and system with separation of session anchor and forwarding anchor.

BACKGROUND

Using an IP address both for routing address and session identification is a cause for problems encountered in mobility, multi-homing (multiple IP addresses), security etc. Separation of session identifier and routing address addresses some of these problems. However, the concept of what to anchor in the network (whether an IP address or a session or flow) remains problematic. Existing mobility systems employing anchors have been anchoring without distinguishing between IP address and session/flow, so that they are anchored together. The failure to distinguish and to separate them makes it difficult if not impossible to change or move the anchors.

Examples of the current use of anchoring are as follows. (1) In Mobile IP, the home agent is the anchor, which is at the link that allocates and advertises routes for the IP address (home address HoA). The home agent cannot change. (2) In Proxy Mobile IP, the Local Mobility Anchor (LMA), which is at the link that allocates and advertises routes for the IP address (home address HoA). Again it is difficult if not impossible to move or change the Local Mobility Anchor. (3) In 3GPP EPC network, the anchor of a PDN connection is the P-GW, which allocates and advertises routes for the IP address. Change of P-GW is currently impossible. (4) In 3GPP UMTS network, the GGSN is the anchor, which allocates and advertises routes for the IP address.

SUMMARY

In accordance with an embodiment of the present disclosure, a method for mobility management for a mobile node that establishes a connection with a first network while in a second network and traverses to a third network includes transferring location management information from the second network to the first network. An indirection path from the first network to the third network is established for data packets directed to the mobile node. The data packets directed to the mobile node are transferred using the indirection path without traversing the second network. This allows for the address anchor of the connection to remain at the second network while providing a flow anchor at the first network, which allows a direct flow to the third network.

In accordance with another embodiment, a mobility management entity for a network including a mobile node that establishes a connection with a first network while in a second network and traverses to a third network includes a processor and a non-transitory computer readable storage medium storing programming for execution by the processor. The programming includes instructions for transferring location management information from the second network to the first network. The programming also includes an instruction for establishing an indirection path from the first network to the third network for data packets directed to the mobile node. The programming also includes an instruction for transferring the data packets directed to the mobile node using the indirection path without traversing the second network.

In accordance with another embodiment, a network includes a first network having a first access router, a first flow manager and a first location manager. The network also includes a second network having a second access router, a second flow manager and a second location manager. The network also includes a third network having a third access router, a third flow manager and a third location manager. When a mobile device on the first network that has established a connection to a correspondent node on the second network moves from the first network to the third network, the location information for the mobile node is transmitted to the second network using the first and second location managers and the second network establishes an indirection path to the third network for communications between the correspondent node and mobile device using the second and third flow managers.

In accordance with another embodiment, a first network includes a correspondent node, a first access router, a first flow manager, and a first location manager. When a mobile device on a second network establishes a connection to the correspondent node and then moves to a third network, the first network uses location information for the mobile device from the first location manager to establish a flow for the connection between the first network and the third network wherein the flow does not traverse the second network.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The structure, manufacture and use of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

Figure 1:
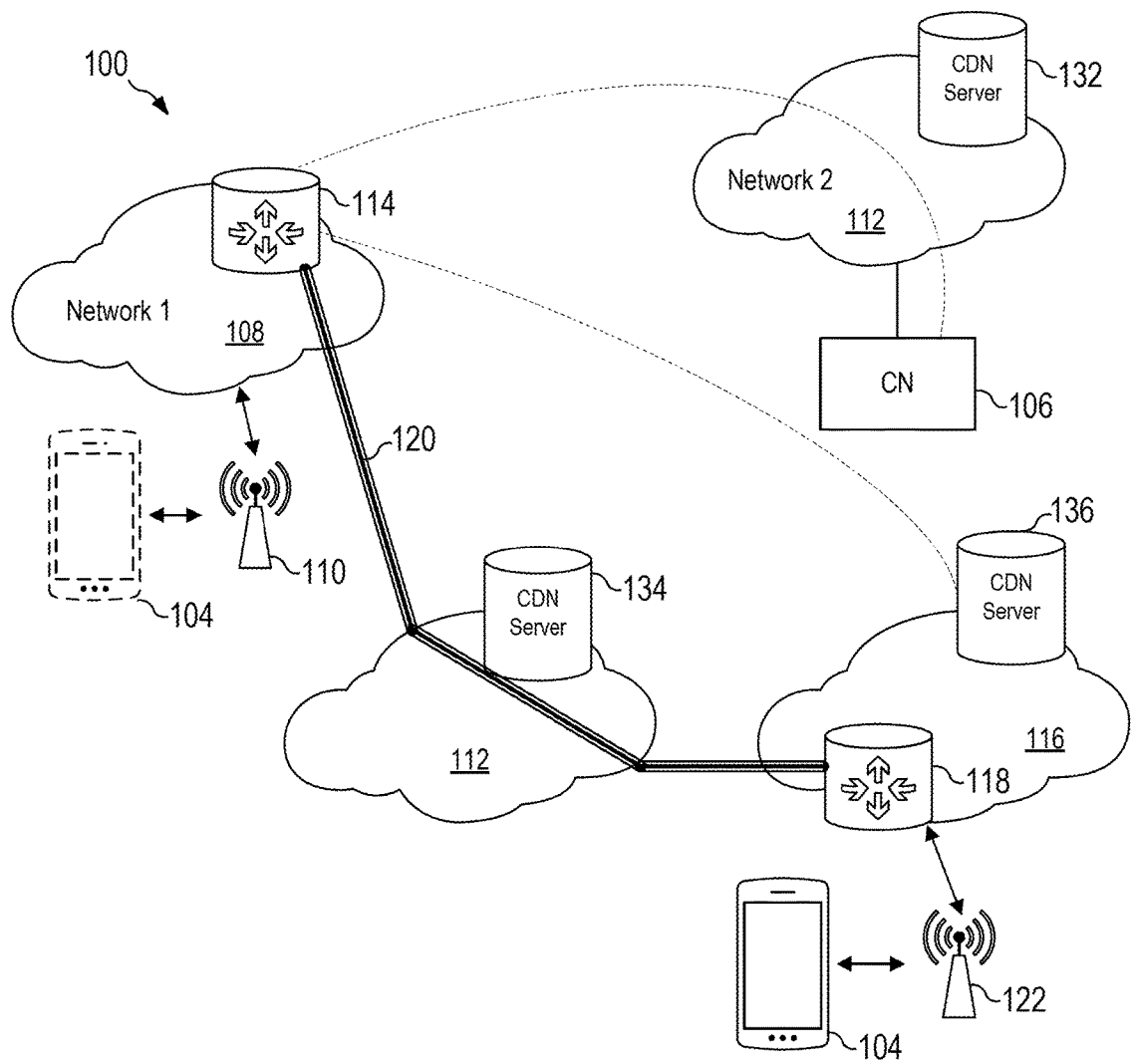
FIG. 1 is a diagram illustrating maintaining a data connection when a mobile device moves between networks.

FIG. 1 is a network diagram illustrating a proxy mobile IP (PMIP) triangle. Mobile node (MN) 104 (dashed outline) initiates a session with correspondent node (CN) 106 where CN 106 will transmit IP data to MN 104 via Network 1 108 and Network 2 112. MN 104 is depicted in FIG. 1 as a smart phone, but may be any mobile enabled device, such as portable computer, tablet, etc. To initiate the session, MN 104 contacts network (NW) 108 via wireless serving point 110. Wireless serving point (WP) 110 may be an enhanced NodeB (eNB) under the 3GPP wireless standards, a Wi-Fi node under 802.11, a WiLAN access point or one of many wireless configurations. CN 106 is connected to NW 112. After the session is initiated, IP data packets are transmitted from CN 106 through NW 112, through NW 108, through WP 110 to MN 104. This relatively simply data delivery is complicated when the MN 104 moves to a different network.

FIG. 1 shows how MN 104 has moved from its original network NW 108 (dashed outline) to another network NW 116 (solid outline) after initiating the data session described above. In FIG. 1, NW 108 includes a mobility anchor (MA) 114, which serves a local mobility anchor (LMA) for MN 104. A mobility anchor provides a connection back to the original point at which MN 104 made the connection so that data directed to MN 104 can be forwarded to MN 104's new location. Mobile access gateway (MAG) 118 on NW 116 communicates with LMA 114 to establish an indirection link 120. That is, packets between MN 104 and CN 106 need to tunnel between MAG 118 and LMA 114, even when MN 104 is far from home network NW 108, but is close to CN 106. For mobile IP, MN 104 continues to use an IP address issued by NW 108 (home network). The IP address issued by the home network is structured such that communication directed to this address will be directed to the home network. In addition, when network 108 issued the address, a process known as "advertising" the address was executed that told the rest of the network that traffic to that address should be directed to the home network. In other words, the IP address anchor is in the home network, and the mobile IP is using the IP address anchor to provide mobility support to the session/flow.

To address mobility in the context of IP communications, MA 114 (LMA) and MAG 118 redirect communications directed to MN 104 via NW 108, through tunnel 120 to NW 116, which then delivers the communication to MN 104 via WP 122. This process may consume network resources unnecessarily. In this example, CN 106 is closer to NW 116 than the "home network" NW 108. Thus, bandwidth in NWs 108, 112 and 116 are used even though unneeded. This problem is exacerbated with modern content delivery systems. With content delivery systems, content is replicated on content delivery network servers (CDN servers) that are widely distributed. Requested content is delivered from the nearest CDN, such as CDN 136, rather than from the primary CN 106. This allows for rapid content delivery and minimizes the amount of overall network bandwidth consumed. However, if the MN 104 moves to another network, this data flow does not know that a nearby CDN 136 is available because this dataflow is originally directed to NW 108.

Figure 2:
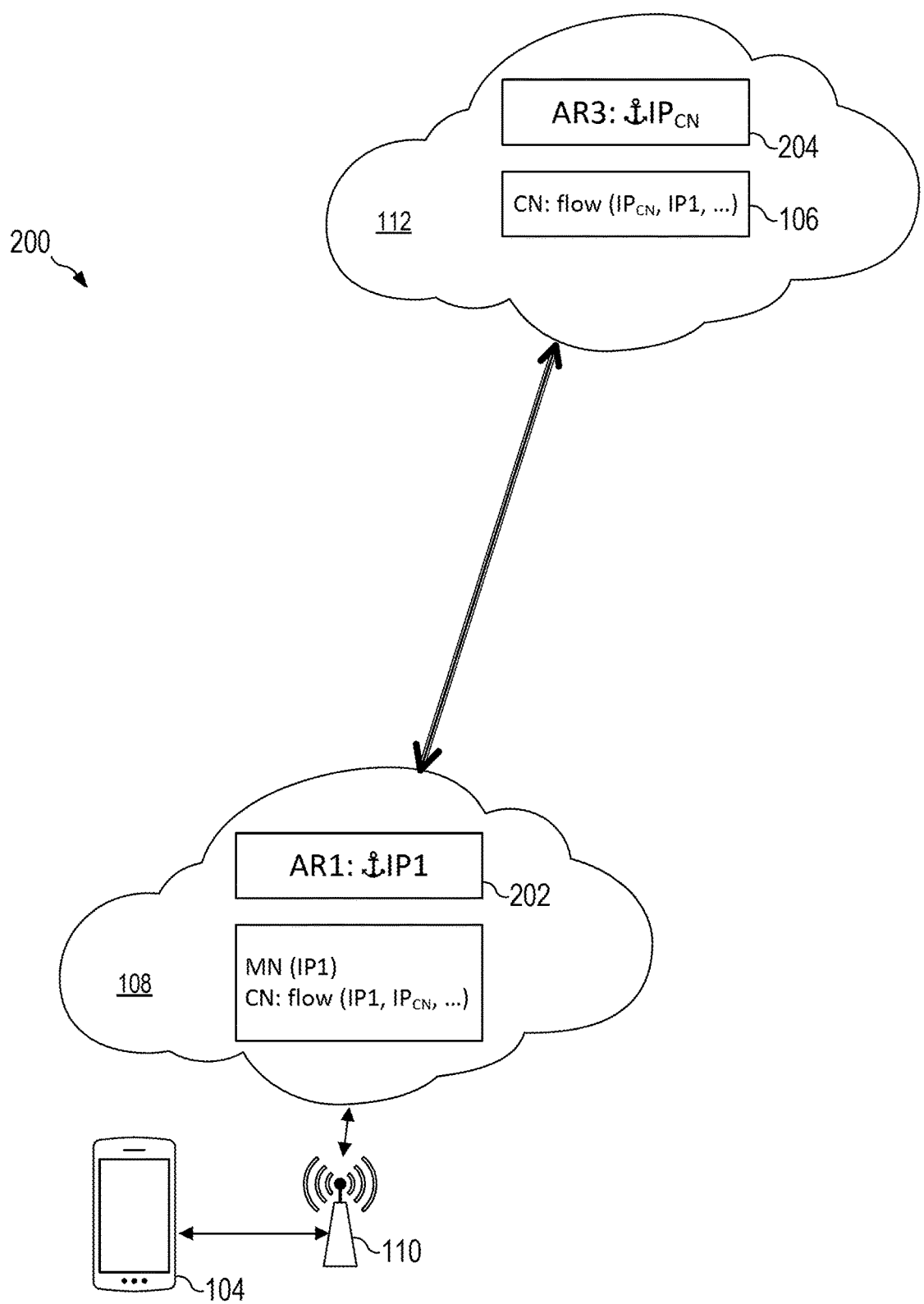
FIG. 2 is a diagram showing the basic elements of a data connection.

FIG. 2 is a network diagram illustrating a simple IP connection. When established on NW 108, an IP address IP1 is created using, for example, the DHCP protocol. IP1 is anchored to access router (AR) 202. A node is topologically anchored to a router (called an address anchor) when the router is able to advertise a connected route into the routing infrastructure for the allocated IP prefix/address. The forwarding function in the routing infrastructure will therefore forward the packets destined to this prefix/address towards this router. An example address anchor is the access router from which the MN 104 has obtained its IP prefix. Because the routing infrastructure is directed to this anchor for this IP address, it is not possible to move the anchor to another network. Similarly, the IP address for CN 106 $IP_{CN}$ is anchored to AR3 204.

Figure 3:
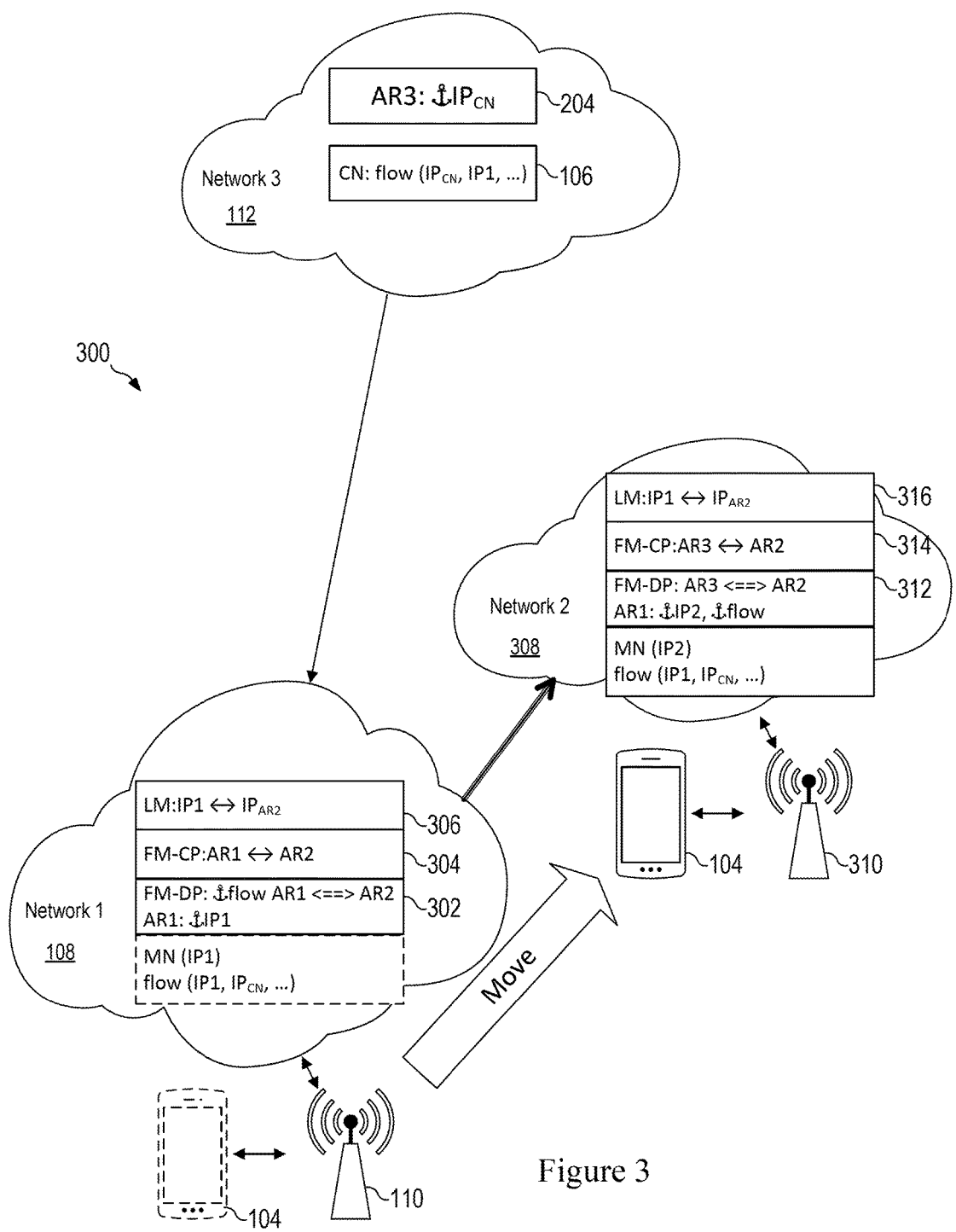
FIG. 3 is a diagram showing the formation of an indirection.

FIG. 3 is a network diagram illustrating the process of maintaining the connection between CN 106 and MN 104 when MN 104 moves from NW1 108 to NW 2 308. Three modules: flow manager data plane (FM-DP), flow manager control plane (FM-CP) and location manager (LM) are instantiated on NW1 108. The operation of these modules is more fully explained in RFC 7429 (published by the Internet Engineering Task Force, https://tools.ietf.org/pdf/rfc7429.pdf), which is hereby incorporated into this specification in its entirety by reference. LM 306 cooperates with associated LM instances, such as LM 316 on NW2 308, and provides location information for each MN on networks managed by the LM system. LM 306 and LM 316 inform FM-CP 304 and FM-CP 314 that MN 104 has moved from NW1 108 to NW2 308. FM-CP 304 and FM-CP 314 set up an indirection path between AR1 and AR2, which is the access router on NW2 308 so that packets belonging to the flow/session received on AR1 for MN 104 are redirected by FM-DP 302 to AR2. In addition, FM-DP 302 and FM-DP 312 use the indirection path established for the flow/session between AR1 and AR2 to forward the packets belonging to the flow. That is, using FM-CP 304 and 314 implements changes so that packets belonging to the flow/session destined to IP1, which is anchored to AR1, are now destined to AR2, which has an IP address IP2 that is anchored to AR2. The FM-DP 302 and 312 perform the forwarding according to such changes. Thus, the system illustrated in FIG. 3 provides one method of indirection.

Figure 4:
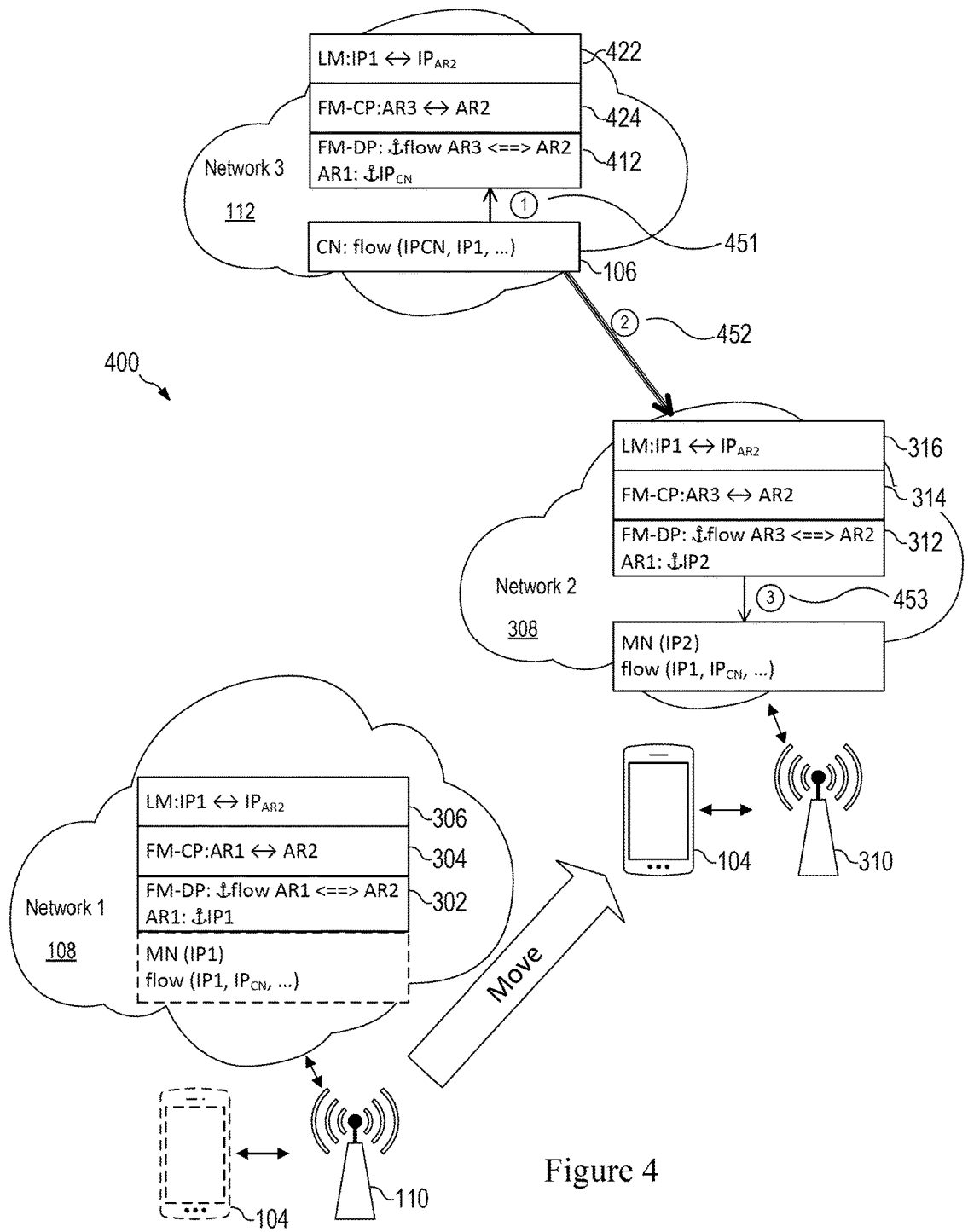
FIG. 4 is a diagram of a data connection including an embodiment of the disclosure.

FIG. 4 is a network diagram illustrating an embodiment of the disclosure. In FIG. 4, NW3 112 includes a flow/session anchor whereas NW2 308 also includes a flow/session anchor. The flow/session anchor includes FM-CP, FM-DP and LM instances. The instance of the location management system is LM 422. When a LM instance such as LM 306 or 316 learns that MN 104 has moved from NW1 108 to NW2 308, other LM instances such as LM 422 may also learn that the location of IP1 has moved to $IP_{AR2}$. However, in accordance with this embodiment, in response to the change in network location of MN 104 as noted by LM 422, FM-CP 424 and FM-CP 314 establish a flow/session redirection between AR3 in NW3 112 and AR2 in NW2 308, to which the flow/session is also anchored. Thus, traffic directed to IP1 will be routed to NW2 308 where AR2 is located. FM-DP 412 and FM-DP 312 use this flow/session redirection to forward the packets of the flow between AR3 and AR2. The presence of flow/session anchor at both AR3 and AR2 enables the packets belong to the flow to follow the indirection between AR3 and AR2. Thus, in step 1 451, when a communication from correspondent node 106 is initiated, the packets belong to the flow are intercepted by forwarding manager FM-DP 412. In step 2 452, the data flow is sent directly from NW3 to NW2. This flow is anchored to FM-DP 312, which connects to IP2 as shown in FM-DP 312. IP2 is the IP address issued to MN 104 by NW2 308. FM-DP is at AR2, so the flow may be directed to MN 104 in step 453 such as by using link-layer forwarding mechanism. Note that IP1 is still anchored to the anchor in NW1 108, but we have instantiated a flow/session anchor in NW3 so that the packets do not need to traverse to NW1 108. By separating the address anchor (IP1 anchored to AR1) from the flow/session anchor (FM-DP AR3<==>AR2), the embodiment of FIG. 4 directs the data flow directly to the network where MN 104 is located, thereby speeding data delivery to MN 104 and avoiding unnecessary traffic on other networks, such as NW1 108.

In accordance with an embodiment, moving the IP address using prefix delegation or SDN/NFV does not need tunneling and provides optimized routes through routing table updates. An embodiment provides for separate anchoring into session/flow anchoring and forwarding address anchoring, which can flexibly be deployed and moved separately as well as moved together, and also with flexibility of having more than one instances of session anchors and/or forwarding address anchors in one or more networks. Such anchors in the network better enable the separation of identifier and address to natively support mobility, multi-homing, etc. Several examples in mobility support are provided herein. Embodiments may be implemented in mobility management in mobile networks such as 4.5 G and 5G and beyond networks. The mobility management resides in MME and PGW in 3GPP EPC. It may reside in virtualized control plane and data plane network functions.

Figure 5:
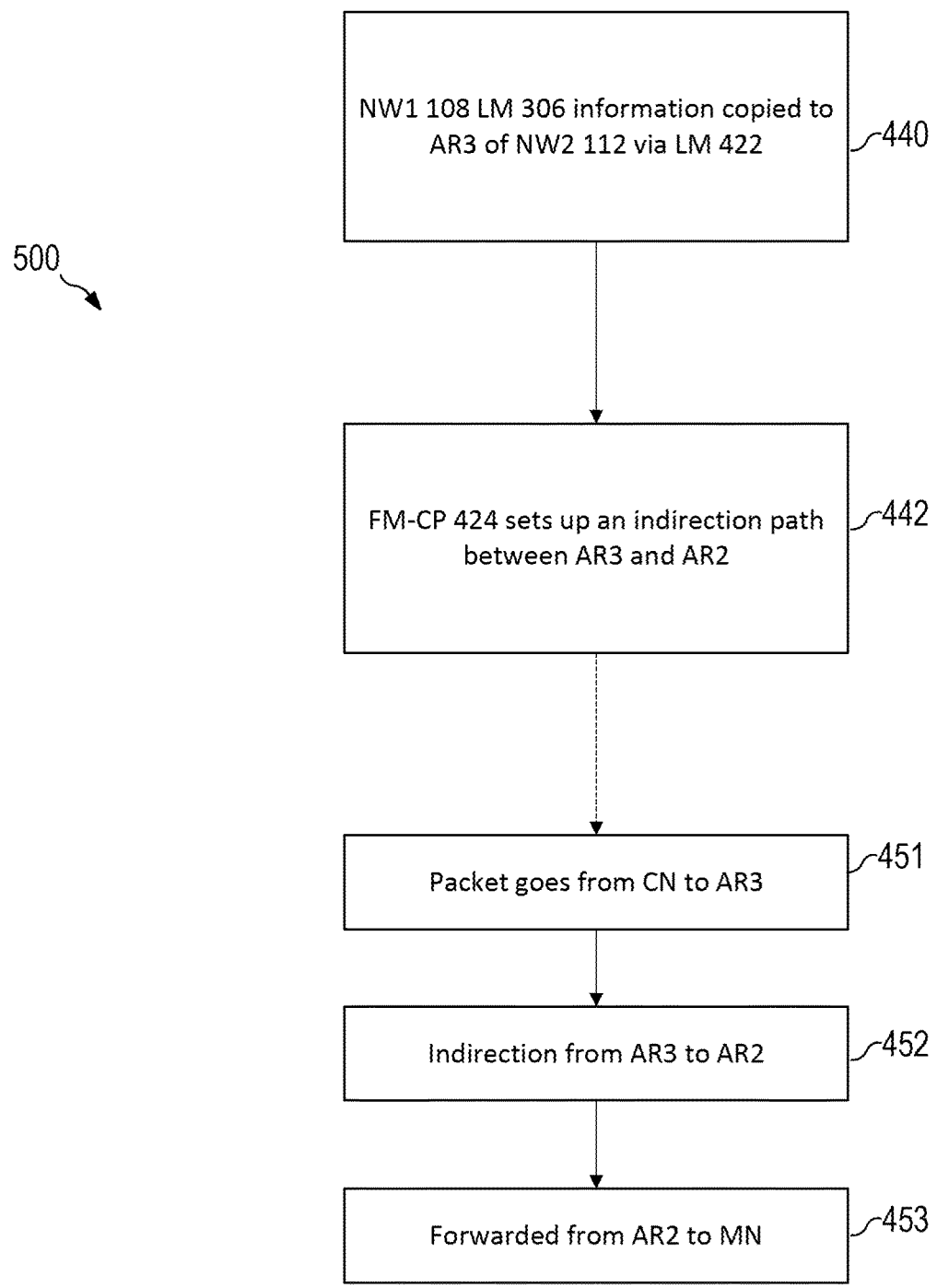
FIG. 5 is process diagram for establishing a indirection according to the embodiment of FIG. 4.

FIG. 5 is a process flow diagram showing the process steps of the embodiment of FIG. 4. In step 440, LM 306 copies the location management information to NW2 112 to indicate that MN 104 has moved. In step 442, FM-CP 424 in conjunction with FM-CP 314 use the information provided by LM 306 in step 440 to set up an indirection path for the flow/session between AR3 and AR2. Steps 451-453 are repeated for each data packet. Steps 440 and 442 are established once when MN 104 moves to NW2 308. The distinction between the two portions of the process is indicated by a dashed arrow. When a data packet is transmitted from CN 106 it is provided to AR3 in step 451. In step 452, the indirection path set up in steps 440 and 442 is used by FM-DPs 412 and 312 to route the packet to AR2 rather than AR1, even though the IP address provided by CN 106 indicates an address anchored in AR1. In step 453, AR2 in NW2 308 transmits the packet to MN 104.

Figure 6:
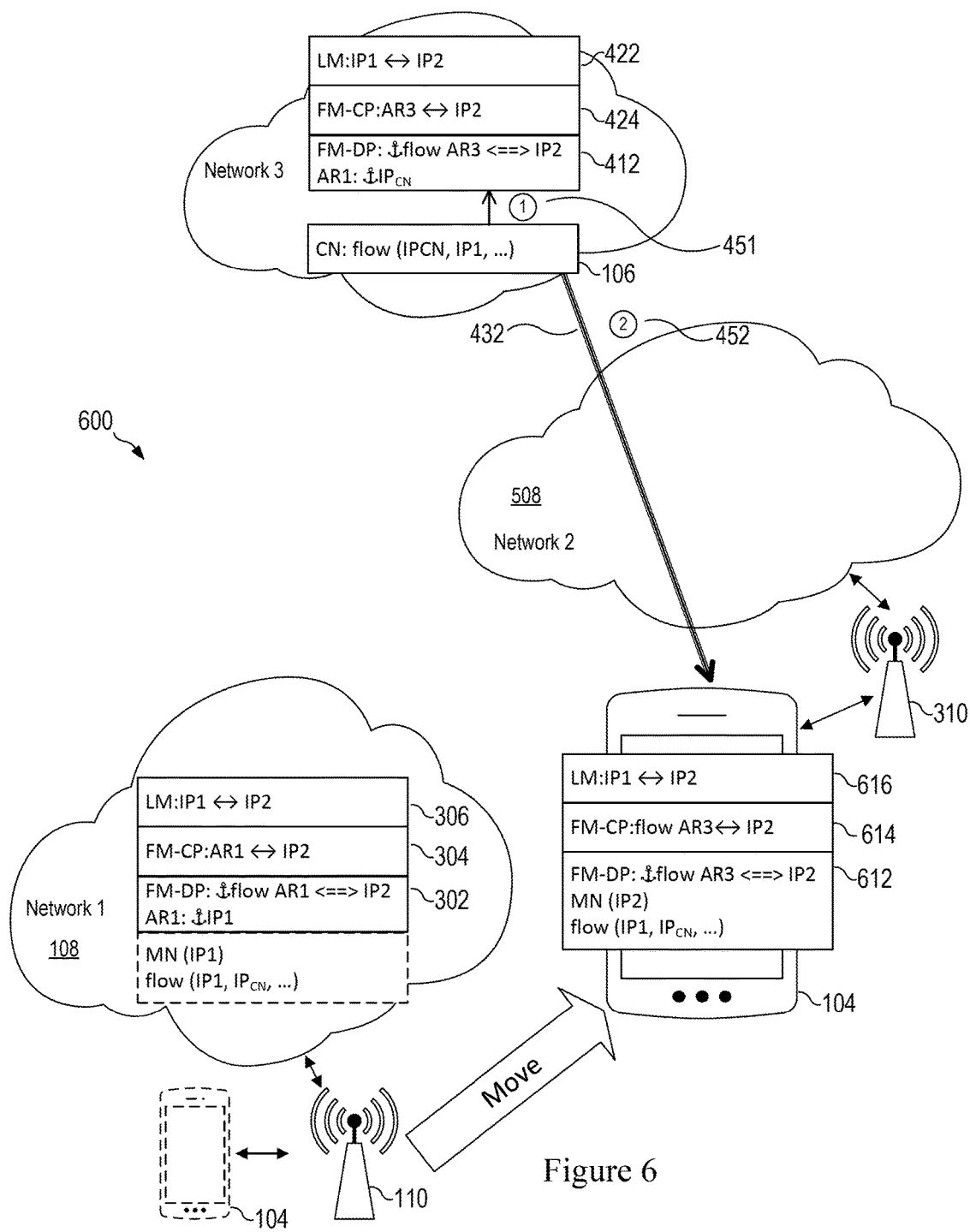
FIG. 6 is a diagram of a data connection including another embodiment of the disclosure where location management and control-plane flow management are combined for all of the networks.

FIG. 6 is a network diagram illustrating another embodiment of the disclosure. The embodiment of FIG. 6 is similar to that of FIG. 4, except that, in FIG. 6, NW2 508 does not or cannot support location management and flow management. Therefore, LM 616, FM-CP 614 and FM-DP 612 are instantiated on MN 104. To support this, MN 104 must be a robust device with ample storage and power availability. A low cost device constrained by processing power and battery limitations may not be a good fit for this embodiment. However, other devices may be able to perform these functions, such as laptops. This embodiment may be more useful on less developed networks, thus allowing the benefits of the embodiment even though some networks cannot directly accommodate the embodiment.

In addition to the location of LM 616, FM-CP 614 and FM-DP 612, a difference in the embodiment of FIG. 6 is from AR3 to IP2, which is the IP address issued to MN 104. Therefore, the access router in NW2 508, if available, is not involved in the indirection. The flow is anchored in AR3 for FM-DP 412 and anchored in MN 104 for FM-DP 612, whereas FM-CP 424 at AR3 and FM-CP 612 at MN 104 set up the indirection path for this flow. Thus, when a communication from correspondent node 106 is initiated, like the embodiment of FIG. 4, the packets of the flow are intercepted by flow manager FM-DP 412 as shown in step 1 451. In step 2 452, unlike the embodiment of FIG. 4, the data flow is sent directly from NW3 through NW2 to MN 104. Note that IP1 can still be anchored to the address anchor at AR1. IP2 may be anchored to an access router in NW2 508. IP2 is the IP address issued to MN 104 by NW2 508. Even though IP1 is anchored to AR1, the packets of the flow are not forwarded according to the address anchor when the flow/session anchor is performing the flow/session indirection. As with the embodiment of FIG. 4, by separating the address anchor (IP1 anchored to AR1) from the flow anchor (FM-DP AR3<==>IP2), the embodiment of FIG. 6 directs the data flow directly to MN 104, thereby speeding data delivery to MN 104 and avoiding unnecessary traffic via other networks, such as NW1 108.

Figure 7:
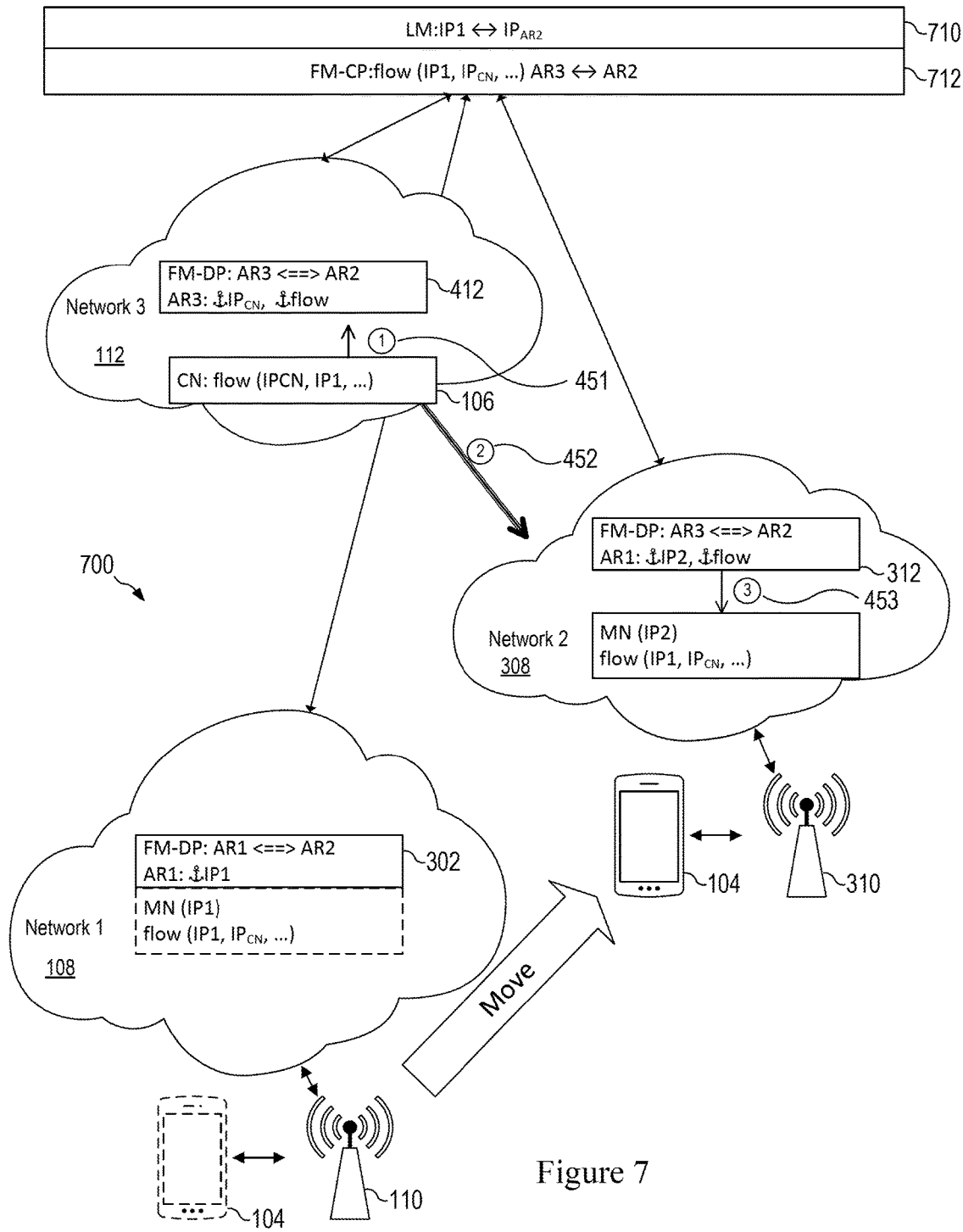
FIG. 7 is a diagram of a data connection including another embodiment of the disclosure.

FIG. 7 is a network diagram illustrating another embodiment of the disclosure. The embodiment of FIG. 7 is similar to that of FIG. 4, except that, in FIG. 7, LM 710 and FM-CP 712 are configured to handle location management and control plane flow management for all of networks NW1 108, NW2 308 and NW3 112. This configuration is advantageous in a software defined network (SDN) scenario where LM 710 and FM-CP 712 can be instantiated in virtual machines that allow for communication to the other components. Except for the instantiation of LM 710 and FM-CP 712, the operation of the embodiment of FIG. 7 is the same as the embodiment of FIG. 4.

Figure 8:
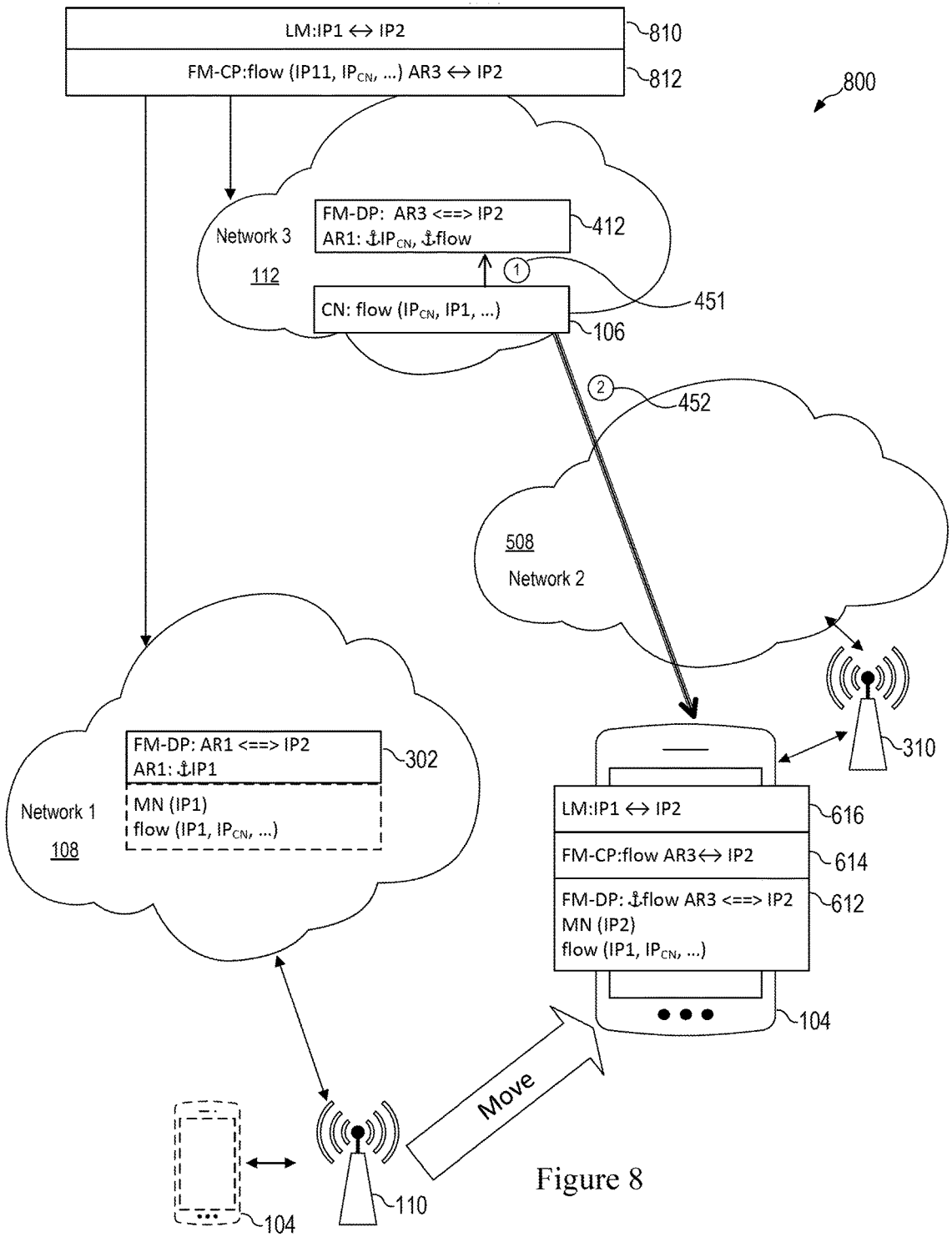
FIG. 8 is a diagram of a data connection including another embodiment of the disclosure where flow control is located on the mobile device.

FIG. 8 is a network diagram illustrating another embodiment of the disclosure. As with other embodiments, network 800 is a network of networks. The embodiment of FIG. 8 is similar to that of FIG. 6, except that, in FIG. 8, LM 810 and FM-CP 812 are configured to handle location management and control plane flow management for at least networks NW1 108 and NW3 112. It is assumed in this configuration that NW2 508 is not part of the SDN that includes LM 810, FM-CP 812, NW1 108 and NW3 112. Therefore, MN 104 requires an instantiation of LM 616 and FM-CP 614. In operation, network 800 operates in the same manner as network 600, except that NW1 108 and NW3 112 share LM 810 and FM-CP 812, but NW2 508 does not.

Figure 9:
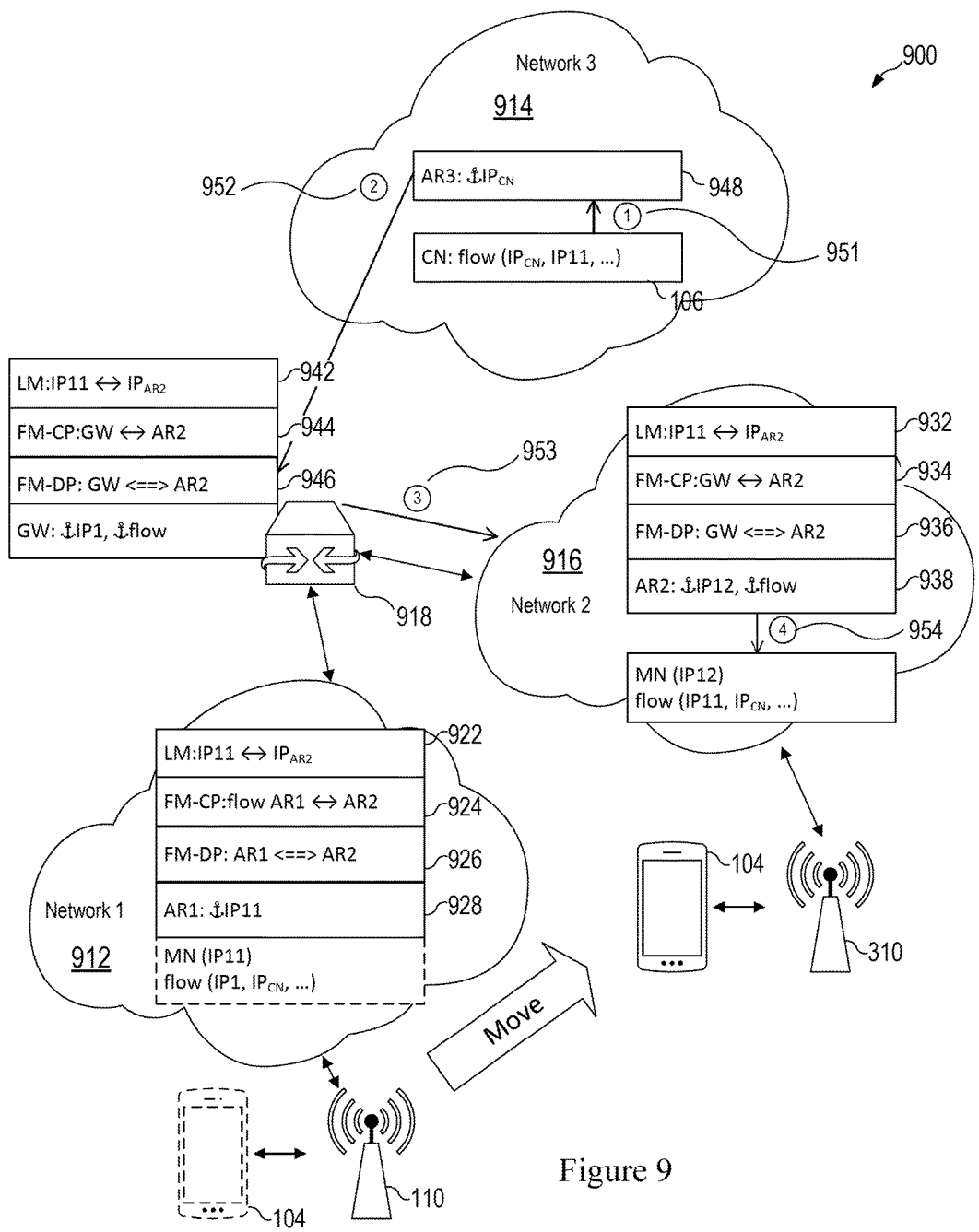
FIG. 9 is a diagram of a data connection including another embodiment of the disclosure that includes a gateway.

FIG. 9 is a network diagram illustrating another embodiment of the disclosure. Network 900 includes a gateway (GW) 918, which can provide an aggregated prefix for IP addresses anchored in AR1 928 and AR2 938. However, NW3 914 does not support the new flow/session function, and may therefore be any IP network. IP11 is issued to MN 104 and anchored to AR1 928. IP11 is included in IP prefix IP1. IP1 is a shorter prefix anchored in GW 918. When MN

104 moves from NW1 912 to NW2 916, AR2 938 allocates IP12, which is also based on the shorter prefix IP1. IP12 is anchored to AR2 938.

The movement of MN 104 is monitored by LM 922, LM 932 and LM 942, which show the movement from IP11 to an $IP_{AR2}$. Because IP1 is a GW 918 prefix, FM-CP 944 establishes a flow indirection from GW 918 to AR2 938 (NW2 916). FM-DP 946 uses this established indirection to forward the packets of the flow from GW 918 to AR2 938 (NW2 916). The flow/session anchor for this flow is IP1, thus GW 918 serves as an anchor/advertising point in this embodiment.

When a packet from CN 106 is directed along the flow originally established for the connection to MN 104 (i.e. $IP_{CN}$, IP11, . . . ) as shown in step 1 951, it starts from CN using $IP_{CN}$, which is anchored to AR3 948. As this flow is directed to an address with the IP1 prefix, the packet is forwarded to gateway 918 in step 952. LM 922 has informed LM 942 that IP11 has moved to AR2. Using this information, the data flow is redirected by FM-DP 946 through gateway 918 to AR2 938 in NW2 916, as shown in step 3 952. In NW2 916, the flow is forwarded to MN 104 using link-layer, as shown in step 4 954.

Figure 10:
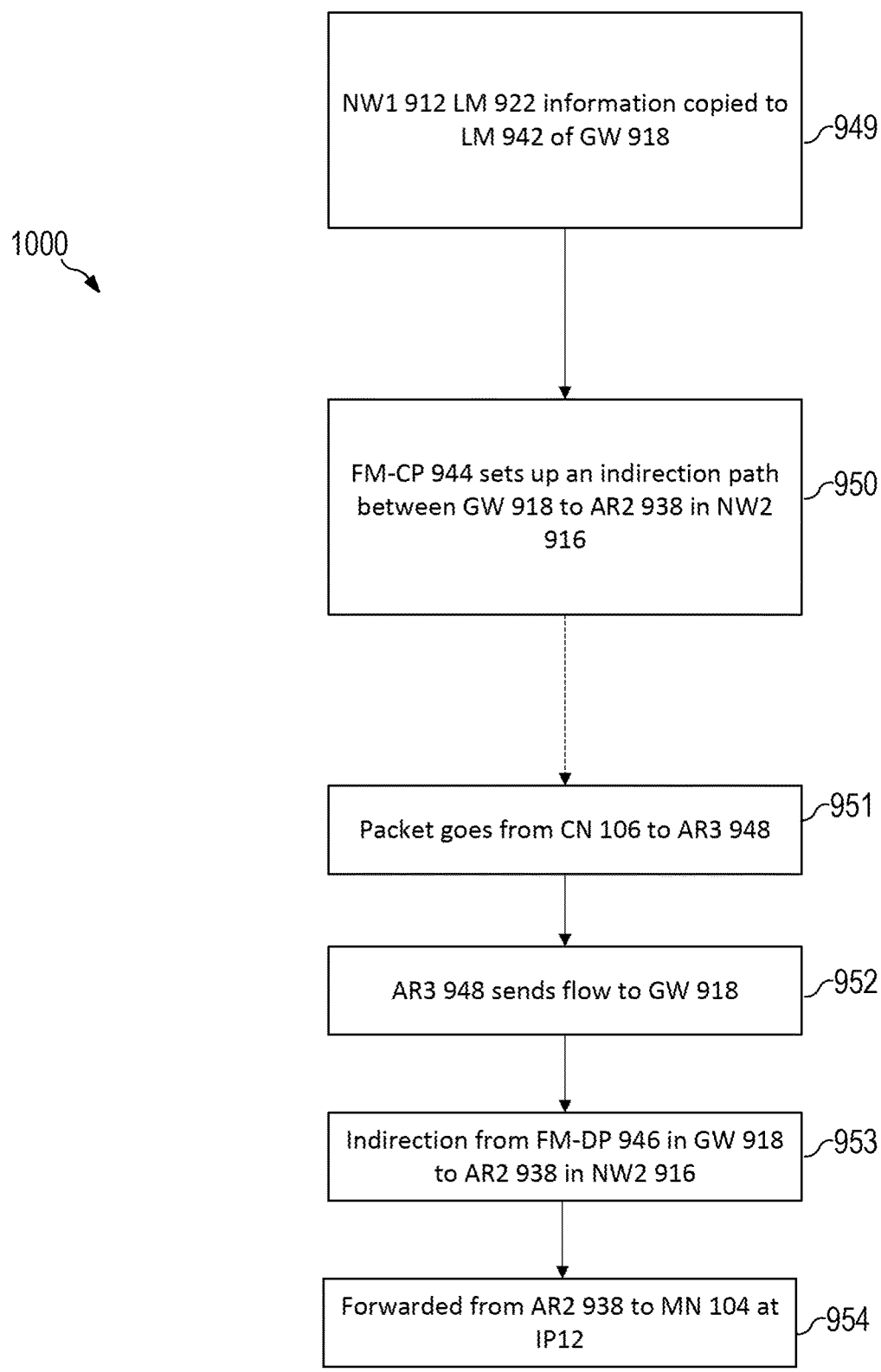
FIG. 10 is process diagram for establishing a indirection according to the embodiment of FIG. 9.

FIG. 10 is a process flow diagram showing the process steps of the embodiment of FIG. 9. In process 1000, in response to the movement of MN 104 to NW2 916, LM 922 copies the movement information to LM 942 in step 949. When the packets of the flow arrives GW 918, FM-CP 944 uses the information from LM 942 to create an indirection path from GW 946 to AR2 938 in NW2 916.

When packets are sent from CN 106 intended for MN 104, the packet goes to AR3 948 as shown in step 951. In step 952, AR3 948 lacks the flow/session anchor function and therefore forwards the packets towards AR1. Yet it needs to enter the network through GW 918. The FM-DP 946 at GW 918 determines the packets belong to the flow that is to be handled by indirection and therefore intercepts these packets. In step 953, the packet is directed from GW 918 to AR2 938. In step 954, the packet is directed to MN 104 from AR2 948 using lower layer switching, which AR2 knows is related to IP11 based on information from LM 932.

Figure 11:
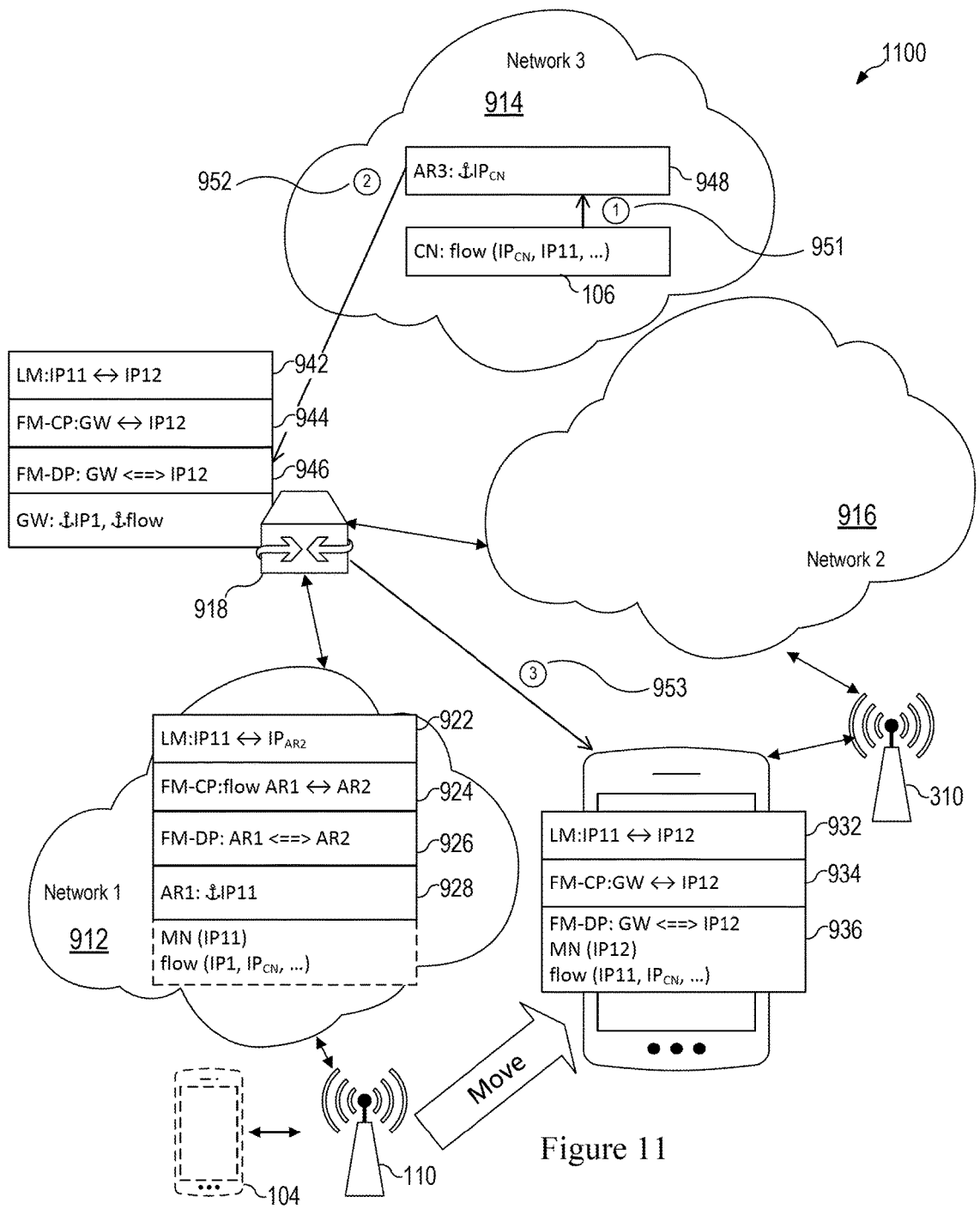
FIG. 11 is a diagram of a data connection including another embodiment of the disclosure where flow control is located on the mobile device.

FIG. 11 is a network diagram illustrating another embodiment of the disclosure. Network 1100 is a modification of network 900 in FIG. 9. In this embodiment, LM 942 communicates with LM 922 after MN 104 has moved to NW2 916. In this communication, LM 922 tells LM 942 that MN 104 has been assigned the IP address IP12. Therefore, FM-CP 944 will set up the indirection path from GW to IP12, and FM-DP 946 will forward packets from CN 106 destined for MN 104 using this indirection path. That is, FM-CP 944 can establish an indirection path directly to IP12 as opposed to the indirection path of FIG. 9 that was directed simply to AR2 938, but required AR2 938 to forward to the MN 104.

Figure 12:
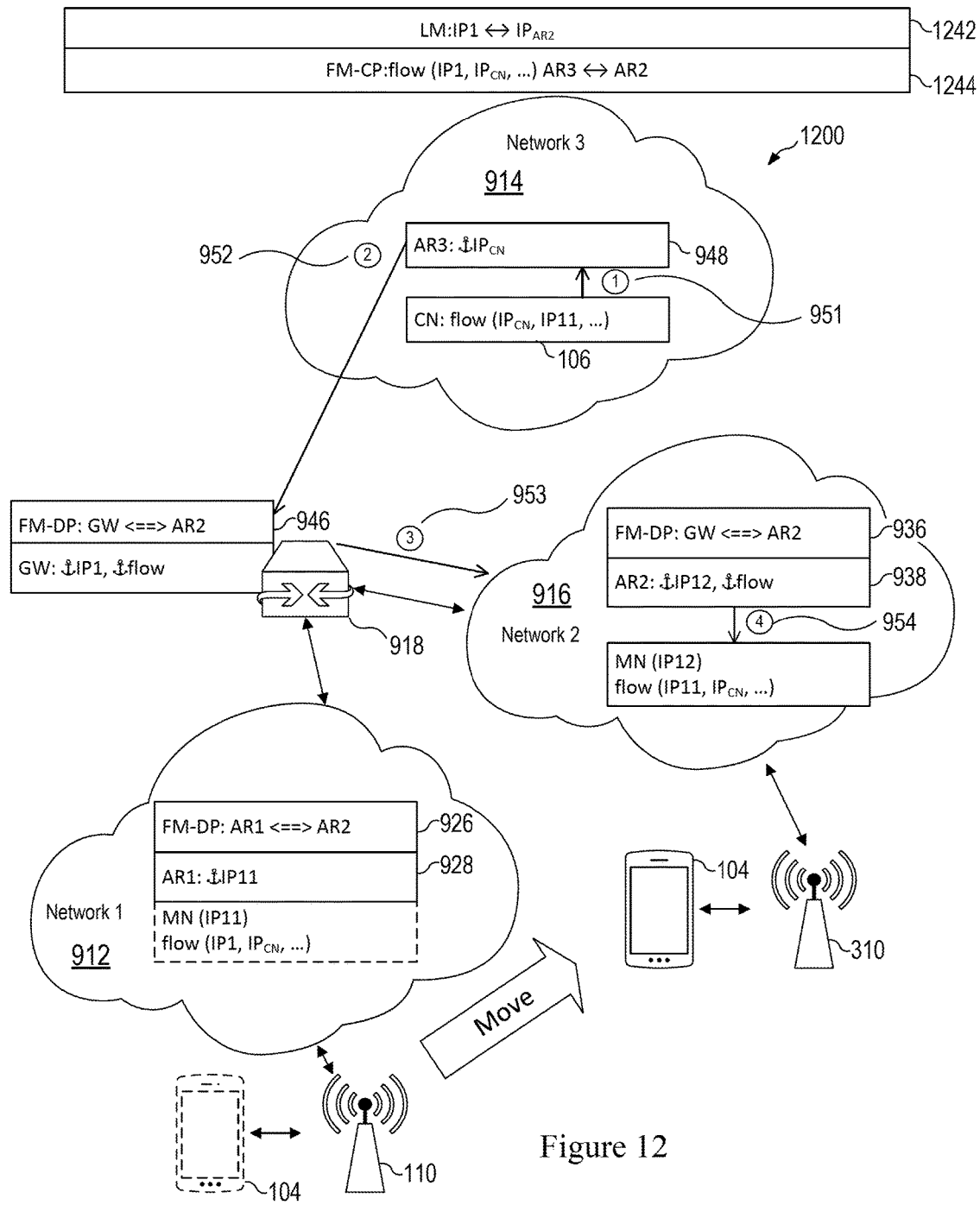
FIG. 12 is a diagram of a data connection including another embodiment of the disclosure where location management and control-plane flow management are combined for all of the networks.

FIG. 12 is a network diagram illustrating another embodiment of the disclosure. Network 1200 operates in the same manner as network 900 with the exception that LM 1242 and FM-CP 1244 provide location management and control plan flow management, respectively, for both NW1 912 and NW2 916 as well as GW 918. As noted above, this configuration is suitable for use in SDN systems that allow for instantiation of LM 1242 and FM-CP 1244 in separate virtual machines.

An embodiment provides separate flow/session anchoring and forwarding address anchoring. An address anchor of an address is such that packets destined to the address will be forwarded along a path that traverses.

An embodiment provides flexibility to deploy session anchors and address anchors so that they can be either separate or collocated.

In an embodiment, a first node in first network is using a first IP address belonging to the first network is running a session identified by the first IP address with a third node from a third network. The first node then moves to a second network in which it is allocated a second IP address. Session continuity is needed for the ongoing session which was using the first IP address. Numerous ways to provide mobility support are possible.

An embodiment provides mobility support by leaving address anchor at the first network but putting a session anchor at the third network. The session anchor uses indirection to forward the packets to the second network.

An embodiment provides mobility support by leaving address anchor at the first network but adding an address session anchor and a session anchor at the third network. The session anchor uses indirection to forward the packets to the second network.

An embodiment provides mobility support by adding address anchor and session anchor at or at one link from the border gateway of the operator network where both the first network and the second network belong. Packets destined from outside the operator's network will enter the operator's network at the border gateway. The address anchoring (advertise prefix) will intercept the packets. The session anchor uses indirection to forward the packets to the second network.

An embodiment provides mobility support by adding address anchor and session anchor at or at one link from each border gateway of the operator network where both the first network and the second network belong. Packets destined from outside the operator's network will enter the operator's network at one of the border gateways. The address anchoring (advertise prefix) will intercept the packets. The session anchor uses indirection to forward the packets to the second network.

Figure 13:
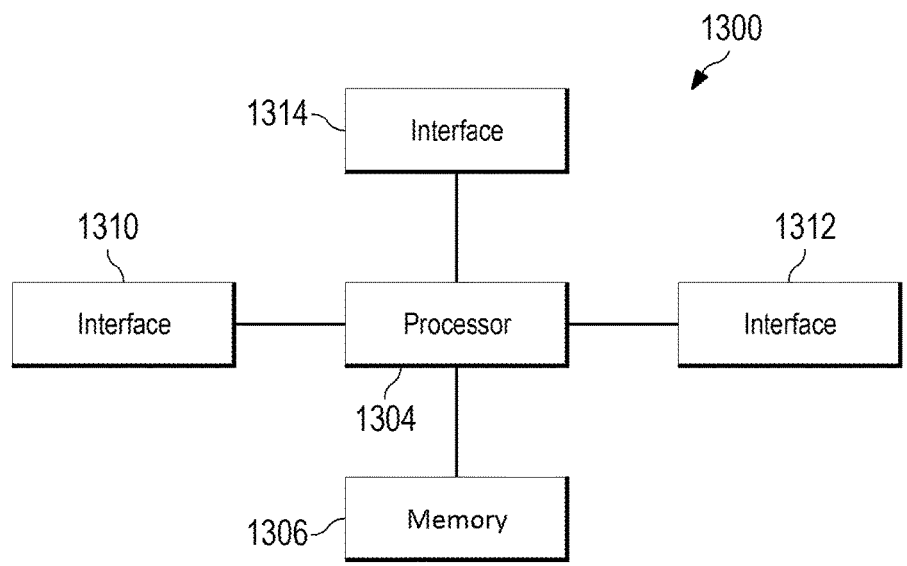
FIG. 13 is a block diagram of a processing device that may be suitably employed for several components described in the detailed description.

FIG. 13 illustrates a block diagram of an embodiment processing system 1300 for performing methods described herein, which may be installed in a host device, such as a serving point. As shown, the processing system 1300 includes a processor 1304, a memory 1306, and interfaces 1310-1314, which may (or may not) be arranged as shown in FIG. 13. The processor 1304 may be any component or collection of components adapted to perform computations and/or other processing related tasks, and the memory 1306 may be any component or collection of components adapted to store programming and/or instructions for execution by the processor 1304. In an embodiment, the memory 1306 includes a non-transitory computer readable medium. The interfaces 1310, 1312, 1314 may be any component or collection of components that allow the processing system 1300 to communicate with other devices/components and/or a user. For example, one or more of the interfaces 1310, 1312, 1314 may be adapted to communicate data, control, or management messages from the processor 1304 to applications installed on the host device and/or a remote device. As another example, one or more of the interfaces 1310, 1312, 1314 may be adapted to allow a user or UE (e.g., personal computer (PC), etc.) to interact/communicate with the processing system 1300. The processing system 1300 may include additional components not depicted in FIG. 13, such as long term storage (e.g., non-volatile memory, etc.).

In some embodiments, the processing system 1300 is included in a network device that is accessing, or part otherwise of, a telecommunications network. In one example, the processing system 1300 is in a network-side device in a wireless or wireline telecommunications network, such as a base station, a relay station, a scheduler, a controller, a gateway, a router, an applications server, or any other device in the telecommunications network such as the devices in NW1, NW2 and NW3 of FIGS. 3-12. In other embodiments, the processing system 1300 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network such as MN 104 of FIGS. 2-12.

Figure 14:
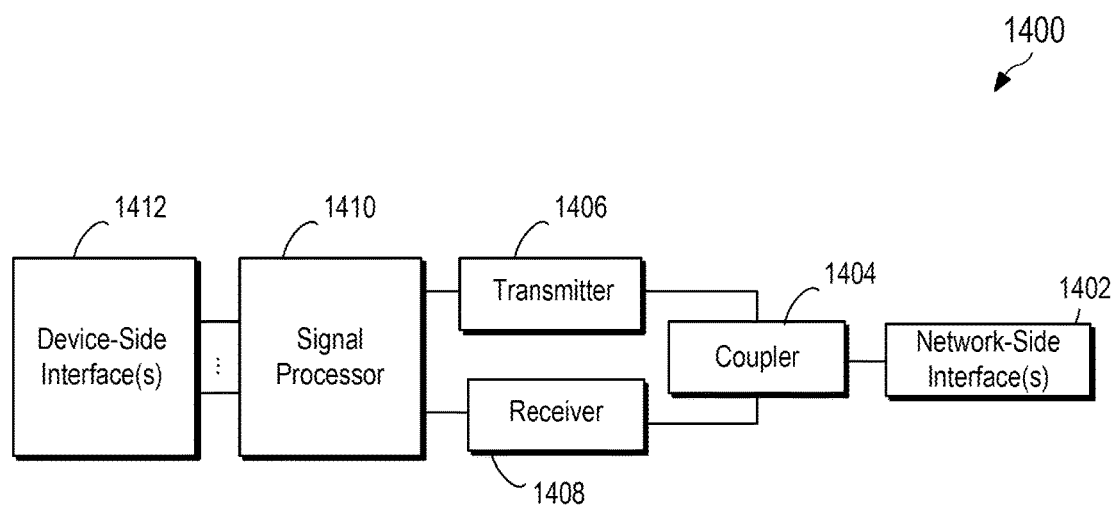
FIG. 14 is a block diagram of a transmitting device that may be suitably employed for several components described in the detailed description.

In some embodiments, one or more of the interfaces 1310, 1312, 1314 connects the processing system 1300 to a transceiver adapted to transmit and receive signaling over the telecommunications network. FIG. 14 illustrates a block diagram of a transceiver 1400 adapted to transmit and receive signaling over a telecommunications network. The transceiver 1400 may be installed in a host device. As shown, the transceiver 1400 comprises a network-side interface 1402, a coupler 1404, a transmitter 1406, a receiver 1408, a signal processor 1410, and a device-side interface 1412. The network-side interface 1402 may include any component or collection of components adapted to transmit or receive signaling over a wireless or wireline telecommunications network. The coupler 1404 may include any component or collection of components adapted to facilitate bi-directional communication over the network-side interface 1402. The transmitter 1406 may include any component or collection of components (e.g., up-converter, power amplifier, etc.) adapted to convert a baseband signal into a modulated carrier signal suitable for transmission over the network-side interface 1402. The receiver 1408 may include any component or collection of components (e.g., down-converter, low noise amplifier, etc.) adapted to convert a carrier signal received over the network-side interface 1402 into a baseband signal. The signal processor 1410 may include any component or collection of components adapted to convert a baseband signal into a data signal suitable for communication over the device-side interface(s) 1412, or vice-versa. The device-side interface(s) 1412 may include any component or collection of components adapted to communicate data-signals between the signal processor 1410 and components within the host device (e.g., the processing system 1300, local area network (LAN) ports, etc.).

The transceiver 1400 may transmit and receive signaling over any type of communications medium. In some embodiments, the transceiver 1400 transmits and receives signaling over a wireless medium. For example, the transceiver 1400 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1402 comprises one or more antenna/radiating elements. For example, the network-side interface 1402 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1400 transmits and receives signaling over a wireline medium, e.g., twisted-pair cable, coaxial cable, optical fiber, etc. Specific processing systems and/or transceivers may utilize all of the components shown, or only a subset of the components and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a transferring unit/module, an establishing unit/module, a transmission unit/module, a flow management unit/module, a location management unit/module, a routing unit/module, and/or a gateway unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for mobility management for a mobile node that establishes a connection with a first network while in a second network and traverses to a third network, the mobile node having a first forwarding address anchor established in the second network, the method comprising:
    establishing a second forwarding address anchor for the mobile node in the third network;
    transferring location management information for the mobile node from the second network to the first network;
    establishing, in the first and third networks, session/flow anchors for a session/flow redirection of the connection, while leaving the forwarding address anchors for the mobile node established in the second and third networks;
    establishing, in accordance with the session/flow anchors, an indirection path from the first network to the third network for data packets directed to the mobile node; and
    transferring the data packets directed to the mobile node using the indirection path without traversing the second network.

2. The method of claim 1 wherein the location management information is transferred to a first location manager instantiated on the first network from a second location manager instantiated on the second network.

3. The method of claim 1 wherein the indirection path is established by a first flow manager instantiated on the first network.

4. The method of claim 1 wherein the location management information is handled by a location manager serving at least the first and second networks and where the indirection path is established between a first flow manager instantiated on the first network and a third flow manager instantiated on the third network.

5. The method of claim 1 wherein the indirection path is established through a gateway.

6. The method of claim 5 wherein a first forwarding address for the mobile node in the second network includes a prefix anchored in the gateway.

7. The method of claim 6 wherein a second forwarding address for the mobile node in the third network includes the prefix anchored in the gateway.

8. A mobility management entity for a network including a mobile node that establishes a connection with a first network while in a second network and traverses to a third network, the mobile node having a first forwarding address anchor established in the second network, the mobility management entity comprising:
a processor; and
a non-transitory computer readable storage medium storing programming for execution by the processor, the programming including instructions for:
establishing a second forwarding address anchor for the mobile node in the third network;
transferring location management information for the mobile node from the second network to the first network;
establishing, in the first and third networks, session/flow anchors for a session/flow redirection of the connection, while leaving the forwarding address anchors for the mobile node established in the second and third networks;
establishing, in accordance with the session/flow anchors, an indirection path from the first network to the third network for data packets directed to the mobile node; and
transferring the data packets directed to the mobile node using the indirection path without traversing the second network.

9. The mobility management entity of claim 8 wherein the location management information is transferred to a first location manager instantiated on the first network from a second location manager instantiated on the second network.

10. The mobility management entity of claim 8 wherein the indirection path is established by a first flow manager instantiated on the first network.

11. The mobility management entity of claim 8 wherein the location management information is handled by a location manager serving at least the first and second networks and where the indirection path is established between a first flow manager instantiated on the first network and a third flow manager instantiated on the third network.

12. The mobility management entity of claim 8 wherein the indirection path is established through a gateway.

13. A combined network comprising:
a first network including a first access router, a first flow manager and a first location manager;
a second network including a second access router, a second flow manager and a second location manager; and
a third network including a third access router, a third flow manager and a third location manager;
wherein, in response to a mobile device on the first network that has established a connection to a correspondent node on the second network moving from the first network to the third network, the mobile device having a first forwarding address anchor established in the first network:
a second forwarding address anchor for the mobile device is established in the third network;
location information for the mobile device is transmitted to the second network using the first and second location managers;
session/flow anchors for a session/flow redirection of the connection are established, in the second network by the second flow manager, and in the third network by the third flow manager, while the first and third access routers leave the forwarding address anchors for the mobile device established in the first and third networks; and
the second network establishes an indirection path to the third network for communications between the correspondent node and the mobile device using the second and third flow managers.

14. The combined network of claim 13 wherein the first, second and third flow managers include a control plane flow manager and a data plane flow manager.

15. The combined network of claim 13 wherein the first, second and third location managers are deployed as a single instantiation.

16. The combined network of claim 13 wherein the first, second and third networks are connected by a gateway and addresses allocated to the mobile device on the first and third networks include a common address prefix anchored to the gateway.

17. A first network comprising:
a correspondent node;
a first access router;
a first flow manager; and
a first location manager;
wherein, in response to a mobile device on a second network establishing a connection to the correspondent node and then moving to a third network, the mobile device having a first forwarding address anchor established in the second network and a second forwarding address anchor established in the third network:
the first location manager receives location information for the mobile device from the second network;
the first network establishes a first session/flow anchor for a session/flow redirection of the connection, in conjunction with a second session/flow anchor established in the third network, while the forwarding address anchors for the mobile device are left established in the second and third networks; and
the first network uses the location information for the mobile device to establish a flow for the connection between the first network and the third network, wherein the flow does not traverse the second network.

18. The first network of claim 17 wherein the first network uses a gateway to establish the flow.

19. The first network of claim 17 wherein the mobile device has a first forwarding address on the second network and a second forwarding address on the third network.

20. The first network of claim 17 wherein the third network includes a location manager, a flow manager and a router instantiated on the mobile device.

* * * * *